May 9, 1950 G. L. HAMMON 2,507,102
VALVE
Filed Nov. 13, 1948 2 Sheets-Sheet 1
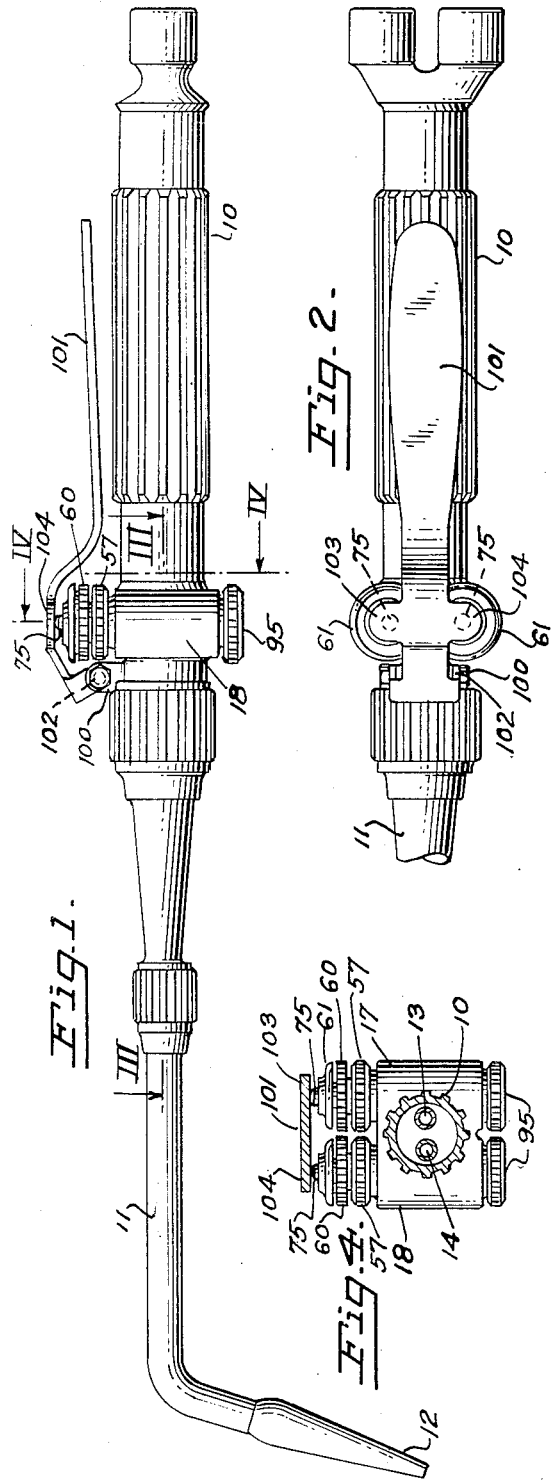
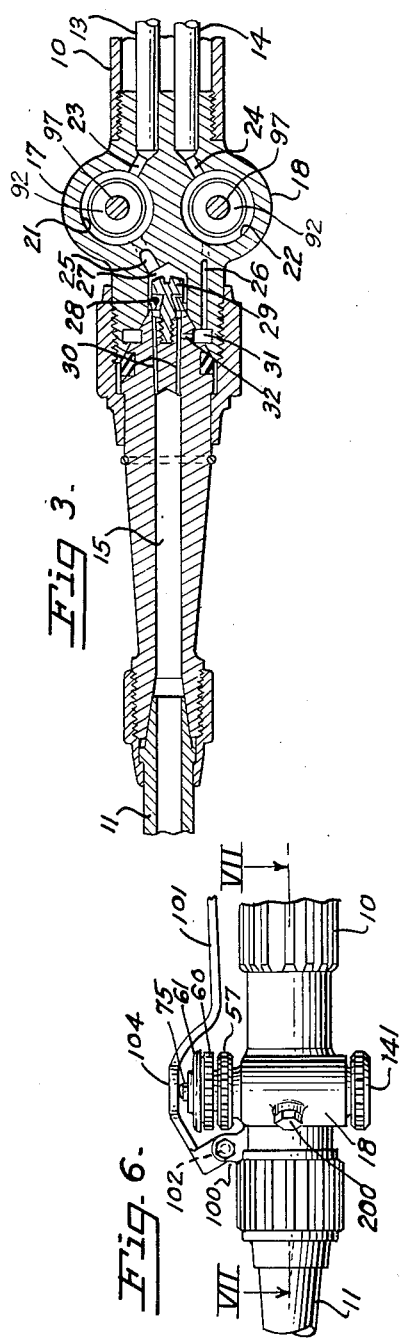
INVENTOR.
GEORGE L. HAMMON
BY
ATTORNEY

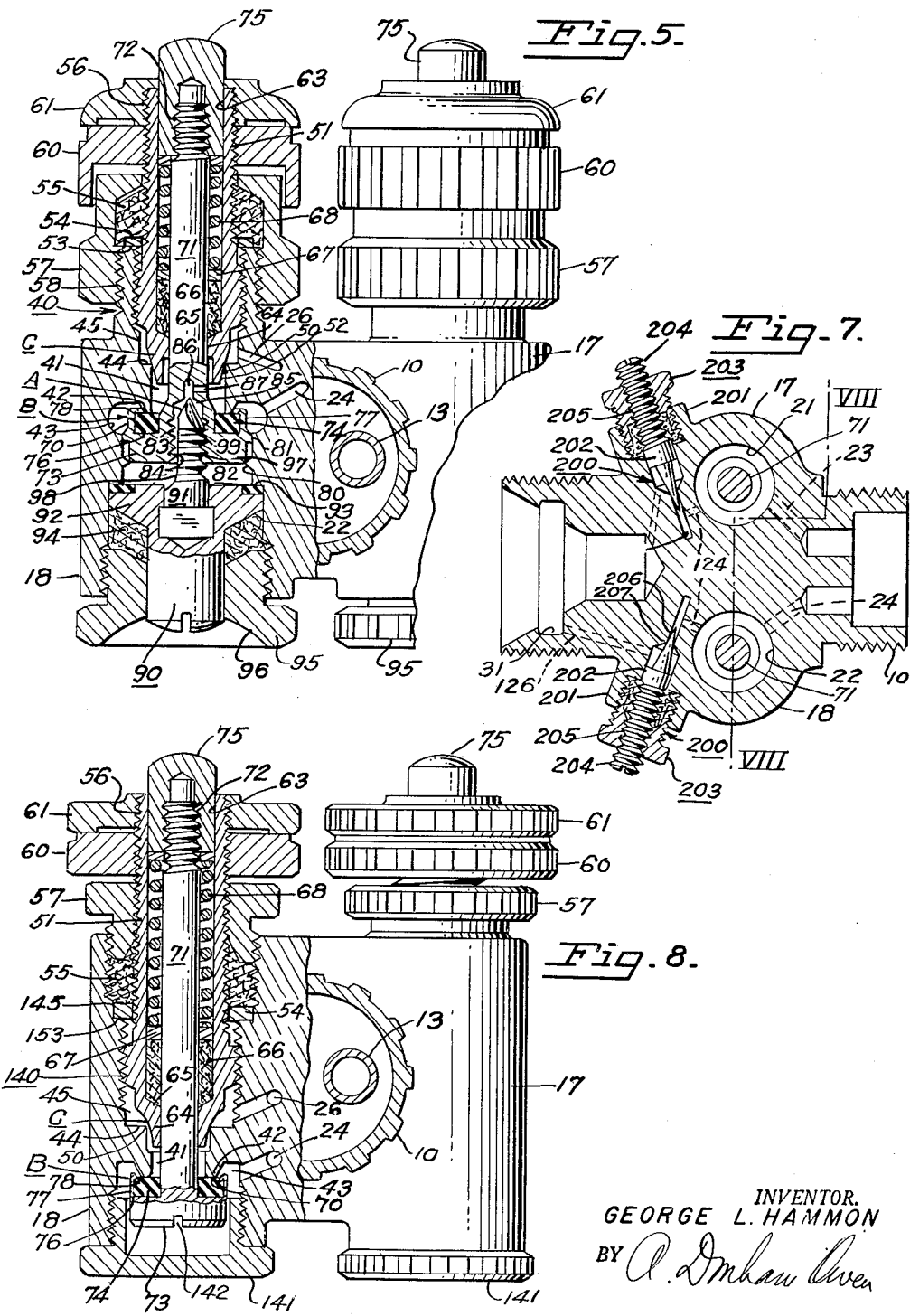

Patented May 9, 1950

2,507,102

UNITED STATES PATENT OFFICE 2,507,102

VALVE

George Leonard Hammon, Oakland, Calif., assignor to National Welding Equipment Co., San Francisco, Calif., a corporation of California Application November 13, 1948, Serial No. 59,871

13 Claims. (Cl. 277—8)

This invention relates to an improved valve combination. More particularly, it relates to a valve combination for controlling the flow of gas and to a valve combination for uniting in selected proportions two or more streams of gas.

Some of the problems solved by this invention occur in connection with the use of gas blow torches, where, for example, a stream of oxygen may be mixed with a stream of acetylene, and the mixture burned for welding or cutting operations.

Much time and large quantities of gas are wasted when gas is turned off and on and the flow adjustments are made by a valve of the ordinary type. Such a valve which is capable of fine adjustment over a wide range, is not capable of rapid adjustment. It takes a long time to turn it all the way off and even longer to turn it back on and readjust the flame. Where two streams of gas must be balanced in order to obtain proper combustion, the problem is especially acute.

This problem cannot be solved by combining several ordinary valves, because the torch must remain light in weight, so that it can be handled without tiring the operator. Nor is it practical to rely on one valve at the tank for turning the stream on and off and to rely on another valve on the torch for fine adjustment. Convenience demands that all the controls be on the torch handle.

Moreover, it is often desirable to have a pilot flame so that the flame does not have to be relighted every time the welder or cutter starts again after a momentary stop. An additional problem is thus to add the pilot feature without making the torch too heavy and without unduly complicating its operation. Furthermore, it is desirable to keep the gases properly mixed for the pilot frame, so as to avoid the dirty, sooty type of flame made when acetylene is burned without premixing with oxygen.

One object of this invention is to provide an improved valve combination for use with gas torches.

Another object of the invention is to provide a valve combination in which two streams of gas are simultaneously controlled.

Another object of the invention is to provide a combination of two simultaneously-controlled valve units, each valve unit comprising a quick acting valve, in conjunction with a valve which can be pre-set at any one of a number of positions. By this means the valves may be rapidly adjusted between an off position and a position giving a desired flow, or between a pilot flame and a cutting flame.

Another object of the invention is to provide an improved combination of two simultaneously controlled valve units, each valve unit comprising an on-and-off valve in conjunction with an adjustable valve, having a full-flow position and a pilot position.

Another object of the invention is to provide an improved quick-acting valve for turning on an off a pre-selected flow of gas.

Another object of the invention is to provide an improved three-part valve comprising an adjustable pre-set valve, a pilot valve, and an on-and-off valve, all of which may be contained in a single light-weight housing.

Another object of the invention is to provide a valve inside of a valve, which gives rapid, centralized control of two valve members.

Another object of the invention is to provide a novel valve-in-a-valve-in-a-valve combination which centralizes control of three valve units in one unit.

Other objects and advantages of the invention will be described in detail in conjunction with some preferred embodiments. These descriptions are given to fulfill the requirements of U. S. Revised Statutes, Section 4888, and it is not intended that they should limit the claims to these specific forms.

In the drawings:

Fig. 1 is a view in side elevation of a gas torch which includes a valve combination embodying the principles of the invention;

Fig. 2 is a plan view of a portion of the above torch;

Fig. 3 is a view taken along the line III—III in Fig. 1;

Fig. 4 is a view in section taken along the line IV—IV in Fig. 1;

Fig. 5 is an enlarged view of the portion shown in Fig. 4, with one of the valve units shown in section;

Fig. 6 is a view in side elevation of a portion of a torch, showing a modified form of valve combination;

Fig. 7 is an enlarged view in section taken along the line VII—VII in Fig. 6; and Fig. 8 is taken along the line VIII—VIII in Fig. 7.

The combination illustrated is used for combining two streams of gas in various selected proportions and amounts. The torch shown in Figs. 1, 2, and 3 includes a rear handle portion 10 which houses the valves. To the front end of the handle 10 is attached a welding or cutting tip 11 having a nozzle 12. Inside the handle 10 are two gas conduits 13 and 14 which lead to the valve combination described herein. From the valve, the gases pass into a single conduit 15 and from there into the welding tip 11.

The torch handle 10 is bossed at 17 and 18, and the bosses are bored at 21 and 22 to house the valves (see Fig. 3). The two inlet passages 23, 24 lead respectively from the conduits 13, 14 into the bores 21, 22. Higher up in the bores 21, 22 are the outlet passages 25, 26.

In the oxy-acetylene torch shown in Fig. 3, oxygen passes from the conduit 13 through the the inlet passage 23 to the valve bore 21 and out through passage 25, into an intermediate chamber 27. From there the oxygen passes through fine needle openings 28 in a nozzle 29 and into an annular mixing chamber 30. Meanwhile, acetylene is brought from the tube 14 into the bore 22 through the passage 24 and passes out through the passage 26, into an annular whirl chamber 31. From there it passes through a conduit 32 into the annular mixing chamber 30. The gases are mixed under substantial pressure but are permitted to expand somewhat in the conduit 15 on their way to the nozzle 12.

The form of the invention shown in Figs. 1 to 5, inclusive, comprises a needle valve A inside a quick-acting two position valve B, which itself is inside a valve C capable of fine adjustment. The two valves in the bores 21 and 22 are identical, though they may be separately adjusted, and therefore only one of them will be discussed, the acetylene valve 40, shown in section in Fig. 5.

The portion of the bore 22 between its inlet 24 and outlet 26, is a narrow passageway 41. At the lower end of the passageway 41 (adjacent the inlet 24) is a raised-rim valve seat 42, around which is a wide inlet chamber 43. At the upper end of the passageway 41, the bore is stepped back at 44, to provide at its inner corner a valve seat for an adjustable valve 50.

Above the step 44, the wider bore passage 45 is threaded, except for a smooth portion adjacent the stop 44, to receive the hollow stem 51 of the adjustable valve 50. The lower end 52 of the stem 51 is preferably frusto-conical, so that the gap between it and the valve seat 44 may be widened or narrowed simply by moving the stem 51 in or out, and this gap is the opening of the valve 50. The valve 50 is thus capable of fine adjustment, but is not a quick acting valve.

The mechanism for preventing leaks from the valve 50 is mounted above the valve. The rim 53 at the upper end of the boss 17 supports a washer 54, and on top of the washer is a packing 55 which both lubricates the threads 56 of the upper inset portion of the sleeve and prevents leaks through the top of the valve case. The packing 55 is held tightly around the stem 51 and against the washer 54 by a packing nut 57 which fits over the core 51 and threads around the outside of the boss 17 at 58.

The complementary adjusting and lock nuts 60 and 61 are threaded around the stem 51 above the packing nut 57. By turning these the core may be moved in and out to narrow or widen the clearance between the seat 44 and the conical end 52 of the valve 50. The clearance at that point determines the maximum flow through the valve 40, and comprises the one setting of the adjustable valve 50. Once set and locked, it cannot be moved accidentally, and the torch will deliver a set maximum flame.

The stem 51 is a hollow tube, and its bore 63 houses the quick-acting valve 70. The valve 70 comprises a long narrow stem 71, threaded at its upper end 72 and flared widely at its lower end 73 to hold a seating member 74 which may engage the seat 42 to shut off the air through the outlet 26 or (when the valve 70 is depressed) may be lowered to permit gas to pass through the passageway 41.

Except for a narrow guide passage 64, which maintains the core 71 in vertical alignment and provides an inset rim 65, the bore 63 is substantially wider than the stem 71. A packing 66 fits against the conical upper end of the passage 64 to prevent leakage, a washer 67 resting on its upper end. A spring 68 rests on top of the washer and fits around the stem 71. The spring 68 is compressed at its upper end by a cap 75, which is threaded around the stem at 72. The spring 68 urges the valve 70, into a normally closed position, except when the cap 75 is pressed down and the stem 71 moved down, against the pressure of the spring.

The seating member 74 of the valve 70 is preferably a soft washer, of neoprene or similar material. It is held in an annular cavity 76 by crimping over the rim 77 at 78.

The downward movement of the valve 70 may be limited by an inset rim 80 in the housing bore 22 which engages prongs 81 on the rim 77. However, the gas in the chamber 43 is at all times in communication with the chamber 82 below the end 73.

As so far described, the valve combination comprises quick-acting valve 70 inside an adjustable maximum flow valve 50. Almost the entire description so far applies equally well to the valve shown in Figs. 6 to 8 which may be used with a separate pilot valve, in a manner to be explained presently. The only exception so far is that the latter's valve housing is not exteriorly threaded, the bore 21 being stepped back at 145, and the packing being held against the rim 153. However, the valve 40 of Figs. 1 to 5 includes in addition a pilot valve partly inside the inner, quick acting valve, and the description of this feature of the valve will be completed before describing the combination shown in Figs. 6 to 8.

The lower end of the member 73 is axially bored at 83. The lower end of the bore 83 is threaded at 84, and its upper unthreaded end is stepped in at 85 to form a seat for the pilot valve 90. Above the seat 85, a still narrower axial bore 86 leads to a transverse passage 87. The passage 87 is beyond the seating member 74 and communicates at all times with the passageway 41. Thus, unless the valve 50 is completely closed, gas may pass from the bore 86 out the outlet 26. The amount of flow of gas is determined by the needle valve 99.

The valve 99 comprises a flared stem 91, which includes a washer 92 to cushion it against a shoulder 93 at the upper limit (closed position) of the valve 90. Packing 94 is tightly retained below the stem 91 by the packing nut 95, threaded in the lower end of the bore 21. The nut 95 is dished at 96, and the slotted rear end of the stem 91 projects through and may be adjusted by a coin such as a ten cent piece.

The forward end of the stem 91 comprises a needle-tipped screw 97 which threads into the bore at 84 and is slotted at 98. Gas will always pass up the bore 83 to its seat 85. The clearance between the seat 85 and the needle 99 determines the pilot flow.

As already mentioned, the oxygen valve is identical in structure with the acetylene valve just described. When both of the valves are separately adjusted to give the desired mixture both at maximum flow and at pilot flow, it is desirable to control them simultaneously. For the purpose a bracket 100 is secured to the torch (see Figs. 1 and 2), and a valve handle 101 is pivoted here by a pin 102. The torch can be controlled with one hand, because two ears 103 and 104 on the handle 101 engage the caps 75 of the two valves and depress them simultaneously. There is enough play in the handle so that each valve can be differently adjusted.

The operation of the valve combination shown in Figs. 1 to 5 is as follows: When the handle 101 is depressed, the stem 71 is pushed down against the pressure of the spring 68. The seating member 74 at the lower end of the stem 71 is thus pushed away from the seat 42, and gas will flow from the conduits 13, 14 into the inlet openings 23, 24, past the seats 42 and into the passageways 41. By threading the stems 51 in or out of the bores 21, 22 the amount of flow past the seats 44 into the outlets 25, 26 is determined. The two valves are adjusted for the best combustion ratios. Oxygen flows from the outlet 25 through the chamber 27 and nozzle 29 into the mixing chamber 30. There it is joined by acetylene gas which has come out the outlet 26 through the whirl chamber 31. The gases are mixed in the chamber 30 and flow down conduit 15 to the nozzle tip 12, where they are ignited.

When the handle 101 is released, the springs 68 force the stems 71 up and close the members 74 against the seats 42. If the needle valves 90 are closed, there will be no flow at all. However, if the needle 99 is backed up from its seat 85 a short distance, there will be a flow of gas from the inlet 23 or 24 up the bores 83, 86 and 87 into the passageway 41, past the seat 44 and thence out the outlet 25 or 26. The two needle valves are preferably balanced to assure proper combustion of the pilot flame, so that it will not be sooty.

Figs. 6 to 8 illustrate a modified form of valve, when the pilot valve is separately housed.

The valve 140 is like the valve 40, without the pilot valve 90. A removable cap 141 closes the bore 21 tightly. When the cap 141 is taken off, a screw driver may be inserted in the slot 142 in the stem end 73 to adjust the height of the cap 75. In this manner all of the caps 75 may project at the same height for engagement by the handle.

A passage 124 leads from the chamber 43 of the acetylene gas valve to the pilot valve 200. The torch handle 10 is bossed at 201 and bored at 202 to provide a housing for the pilot valve 200. A hollow, interiorly-and-exteriorly threaded core 203 is screwed into the bore 202, and a stem 204 is threaded into the bore 205 of the core 203. The forward end of the stem 204 is a needle 206, which may seat against the seat 207 or may be retracted to permit passage of a small amount of gas into the passage 126, leading to chamber 31.

Pilot valves 200 are provided on both valves, so that a clean pilot flame may be had.

This modified valve operates similarly to the preferred form of valve. Its pilot valve 200 is separately housed, and there are separate passages bored in the handle 10, but the action is otherwise identical.

Here, then, is a valve which solves the problems mentioned at the beginning of this specification. The valve C is capable of fine adjustment. Inside it is the quick-acting valve B which is moved from off to on by the handle 100 and which is returned to its off position by the spring 68 when the handle 100 is released. The pilot valve may be inside the quick acting valve B (as is valve A in Figs. 1 to 5) or it may be in a separate housing (as is valve 200 in Figs. 6 to 8). Either type of pilot valve is adjustable so that proper combustion can be obtained in the pilot flame as well as in the cutting or welding flame.

The valve is light in weight, so that it can fit easily on the torch handle. It can be turned off and on quickly. Once an adjustment of valve C is made, it need not be changed each time the torch is lighted and extinguished, but can remain in adjustment while the quick-acting valve B is operated to stop and start the cutting flame.

I claim:

1. A valve including in combination a housing having a bore closed at one end, said bore having an inlet opening adjacent said closed end, an outlet opening adjacent the opposite end, and a passageway between said inlet and said outlet, said passageway having a valve seat at each end; a tubular stem mounted adjustably in said bore and closing the open end thereof, the lower portion of said stem extending into said passageway and being adapted to move against and away from the valve seat on the outlet side of said passageway, the bore of said stem having an annular inset rim adjacent its lower end; a cylindrical stem extending through and beyond said tubular stem and having a collar adjacent its upper end and an enlarged head at its lower end, said head being beyond said tubular stem and below said passageway and adapted to close against the valve seat on the inlet side of said passageway and to be moved downwardly away from it; and a spring around said cylindrical stem between said rim and said collar, normally urging said head to a closed position against its seat.

2. The valve combination of claim 1, in which there is also a needle valve in a passage which bypasses the valve seat on the inlet side of said passageway.

3. A valve combination for mixing a plurality of streams of gas, comprising a housing including a pair of valves of the type claimed in claim 1, and a lever pivotally mounted on said housing and adapted to rest on top of the upper ends of all of said cylindrical stems, so that when said lever is depressed, all of said valves will be opened simultaneously.

4. A valve combination including a housing having a bore closed at one end, said bore having an inlet opening adjacent said closed end, an outlet opening adjacent the opposite end, and a passageway between said inlet and said outlet, said passageway having a valve seat at each end; a tubular stem mounted adjustably in said bore and closing the open end thereof, the lower portion of said stem extending into said passageway and being adapted to move against and away from the valve seat on the outlet side of said passageway, the bore of said stem having an annular inset rim adjacent its lower end; a cylindrical stem extending through and beyond said tubular stem and having a collar adjacent its upper end and an enlarged head at its lower end, said head being beyond said tubular stem and below said passageway and adapted to close against the valve seat on the inlet side of said passageway and to be moved downwardly away from it, said cylindrical stem having an axial bore in its lower end, a seat in said bore, and a transverse bore leading from said axial bore into said passageway above said lower valve seat; a spring around said cylindrical stem between said rim and said collar, normally urging said head to a closed position against its seat; and a needle valve in the lower end of said housing bore, adapted to move against and away from the seat in the axial bore of said cylindrical stem.

5. A valve combination for mixing a plurality of streams of gas, comprising a housing including a pair of valves of the type claimed in claim 4, and a lever pivotally mounted on said housing, and adapted to rest on top of the upper ends of said cylindrical stems, so that when said lever is depressed, all of said valves will be opened simultaneously.

6. A valve combination including a housing having a bore closed at one end, said bore having an inlet opening adjacent said closed end, an outlet opening adjacent the opposite end, and a passageway between said inlet and said outlet, said passageway having a valve seat at each end; a tubular stem mounted adjustably in said bore and closing the open end thereof, the lower portion of said stem extending into said passageway and being adapted to move against and away from the valve seat on the outlet side of said passageway, the bore of said stem having an annular inset rim adjacent its lower end; and a spring-pressed valve stem extending through and beyond said tubular stem having a member normally urged against the valve seat on the inlet side of said passageway but adapted to be moved away from it.

7. The valve combination of claim 6, in which there is also a needle valve in a passage which bypasses the valve seat on the inlet side of said passageway.

8. A valve comprising in combination a housing having a bore with a narrow central portion between two wider outer portions, said narrow central portion having a valve seat at each end, said housing also having an inlet opening adjacent and below the lower valve seat and an outlet opening adjacent and above the upper valve seat; a first valve stem threadably retained by said housing in the upper outer bore portion and adapted to be moved against and away from said upper valve seat, said stem having an axial bore extending therethrough with an inset rim adjacent its lower end; a second valve stem slidably mounted in said axial stem bore and extending beyond it at both ends, said second stem having an enlarged head at its lower end movable in said lower wider bore portion and adapted to close against said lower valve seat; a collar of larger diameter than said second stem secured to the upper end of said second stem inside said axial stem bore; and a coil spring around said second stem compressed between said collar and said rim, urging said head normally against its seat.

9. The valve combination of claim 8, in which there is also a needle valve in a passage which bypasses the valve seat on the inlet side of said narrow central bore portion.

10. A valve combination for mixing a plurality of streams of gas, comprising a housing including a pair of valves of the type claimed in claim 8, and a lever pivotally mounted on said housing, and adapted to rest on top of the upper ends of said cylindrical stems, so that when said lever is depressed, all of said valves will be opened simultaneously.

11. A valve combination comprising a housing having a bore with a narrow central portion between two wider outer portions, said narrow central portion having a valve seat at each end, said housing also having an inlet opening adjacent and below the lower valve seat and an outlet opening adjacent and above the upper valve seat; a first valve stem threadably retained by said housing in the upper outer bore portion and adapted to be moved against and away from said upper valve seat, said stem having an axial bore extending therethrough with an inset rim adjacent its lower end; a second valve stem slidably mounted in said axial stem bore and extending beyond it at both ends, said second stem having an enlarged head at its lower end movable in said lower wider bore portion and adapted to close against said lower valve, said second stem being bored at its lower end to provide a passage bypassing said lower valve seat; a collar of larger diameter than said second stem secured to the upper end of said second stem inside said axial stem bore; a coil spring around said second stem compressed between said collar and said rim, urging said head normally against its seat; and a needle valve in said lower wider bore portion and adapted to close against and move away from said bypass seat.

12. A valve combination for mixing a plurality of streams of gas, comprising a housing including a pair of valves of the type claimed in claim 11, and a lever pivotally mounted on said housing, and adapted to rest on top of the upper ends of all of said cylindrical stems, so that when said lever is depressed, all of said valves will be opened simultaneously.

13. A valve combination comprising a housing having a bore with a narrow central portion between two wider outer portions, said narrow central portion having a valve seat at each end, said housing also having an inlet opening adjacent and below the lower valve seat and an outlet opening adjacent and above the upper valve seat; a first valve stem threadably retained by said housing in the upper outer bore portion and adapted to be moved against and away from said upper valve seat, said stem having an axial bore extending therethrough with an inset rim adjacent its lower end; a second valve stem slidably mounted in said axial stem bore and extending beyond it at both ends, said second stem having an enlarged head at its lower end movable in said lower wider bore portion and adapted to close against said lower valve seat; a collar of larger diameter than said second stem secured to the upper end of said second stem inside said axial stem bore; and a coil spring around said second stem compressed between said collar and said rim, urging said head normally against its seat; a passage bypassing said seats and connecting said inlet to the flow from said outlet; and a needle valve interposed in said passage, for providing a pilot flow around said valve.

GEORGE LEONARD HAMMON.

REFERENCES CITED

The following references are of record in the file of this patent:

UNITED STATES PATENTS

| Number | Name | Date |
| --- | --- | --- |
| 1,268,232 | Furman | June 4, 1918 |
| 1,436,145 | Birkenmaier | Nov. 21, 1922 |
| 1,639,540 | Bastian | Aug. 16, 1927 |